Jan. 8, 1946.   L. BENJAMIN   2,392,453
EXPANDIBLE WORK HOLDER
Filed Aug. 23, 1944
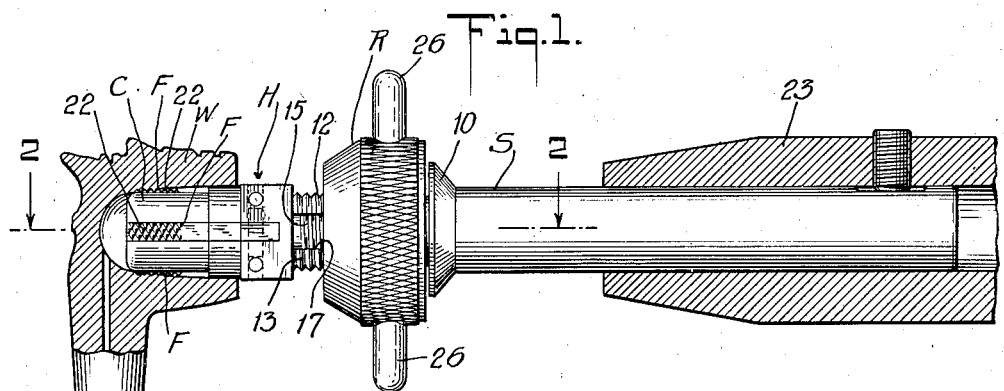
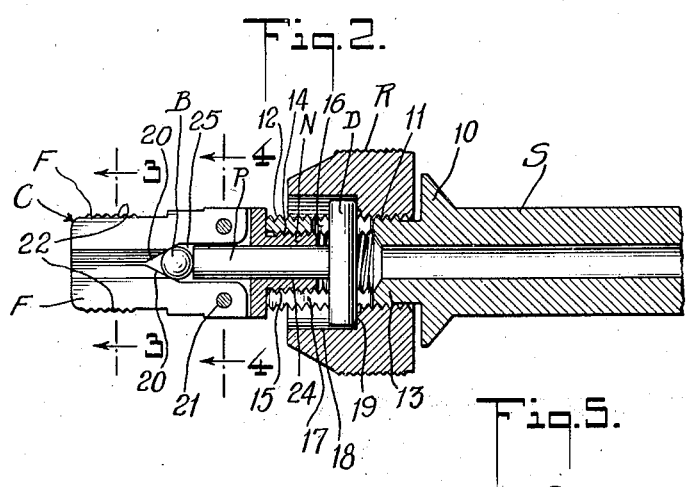
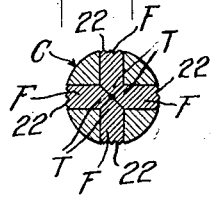
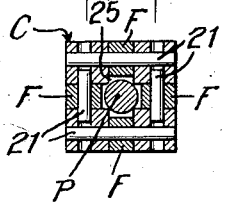
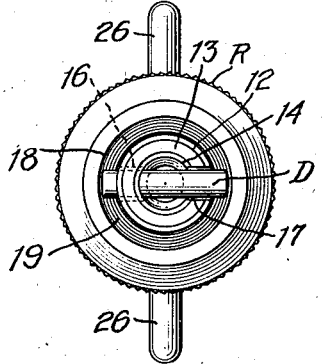
INVENTOR
Louis Benjamin
BY
ATTORNEY Patented Jan. 8, 1946

2,392,453

UNITED STATES PATENT OFFICE 2,392,453

EXPANDIBLE WORK HOLDER

Louis Benjamin, Brooklyn, N. Y.

Application August 23, 1944, Serial No. 550,834

2 Claims. (Cl. 279—2)

This invention is an expandible work holder and more particularly is concerned with improved and serviceable means for desirably sustaining wooden objects during fashioning thereof or carving thereon suitable designs. One object of the invention is realized in the provision of a work holder of the character referred to wherein the work is appropriately and securely held on the holder against slippage during the process of carving. Another object of the invention resides in the provision of efficient and conveniently adjustable means for effectively but detachably gripping the work to bodily rotate with the holder and against slippage relative thereto. A further object is to provide a chuck having novel means in the form of a slidably guided plunger for actuating spheroidal wedgeable means for outwardly directing serrated swingable gripping fingers against a workpiece removably mounted thereon to clamp the workpiece against displacement relative to the chuck. As a further object the invention contemplates the provision of appropriately accessible and rotary means for actuating a linearly guided member to operate the plunger or tumbler to control the displacement of the braking or wedging spheroidal member. Further objects, features and functional and structural advantages of the invention will appear from the following detailed description taken with the accompanying drawing wherein:

Fig. 1 is a side view of the work holder according to the preferred embodiment of my invention.

Fig. 2 is a longitudinally sectional view on the line 2—2 of Fig. 1.

Figs. 3 and 4 are transverse sectional views on the lines 3—3 and 4—4 of Fig. 2, and Fig. 5 is a front view of the work holder however with chuck thereof removed to illustrate the rectilinearly guided driving pin controlled by the outside rotatable collar or driving means.

Illustrative of the embodiment disclosed, the work or workpiece W is removably clamped by the holder generally designated H which comprises, a chuck C removably mounted on the spindle S, control or regulating means in the form of a rotatable collar R adjustably surrounding the spindle, driven means D disposed diametrically of and within the regulatory means R, rectilinearly guided plunger or tumbler means P slidably guided by the externally threaded nipple N of the chuck, and the braking or wedging spheroidal member or ball B for swingably and outwardly displacing the hinged fingers F attached to the chuck.

More particularly, however, the hollow spindle S embodies the annular stop or flange 10 to limit the rotational displacement of the regulator R on the spindle S in a direction away from the chuck C. This regulator is provided with an internally threaded bore 11 adjustably interlocked with the external threads 12 of the hollow stem or socket 13 integral with the spindle S. The socket 13 is also internally threaded to characterize the teeth 14 removably cooperating with the externally arranged teeth 15 of the nipple N of the chuck C.

Interrupting the internally and externally threaded socket 13 is an opening 16 and a diametrically opposed gap 17 which is substantially coextensive with the length of the socket as illustrated. This gap and opening position the driven pin D diametrically of the enlarged bore 18 of the cylindrical regulator R which has an annular abutment shoulder 19 for cooperating with the ends of the driven pin D to shift the latter in a linear direction but relative to the nipple upon rotation of the regulator or control means R in respect to the spindle S.

Where the driven pin D is rectilinearly displaced relative to the socket 13 upon rotation of the regulator, the slidably guided tumbler or plunger P is correspondingly displaced and in a direction towards or against the freely mounted ball or wedge B. Hence the latter is actuated or driven in a direction away from the internally and externally threaded extension 13.

It should be observed that the companion and hinged fingers F include cooperative biased and inclined faces 20. If therefore the plunger P is slidably directed towards the ball B, the latter drives against the internal and inclined faces 20, thus causing fingers F to pivot on their fulcrum pins 21 appropriately held in the body of the chuck C. Or in other words if the regulator be operated, the driven pin D shifts the slidable plunger to drive the ball against the inclined or cam faces 21, thus swingably shifting the gripping fingers outwardly or against the work W mounted in the chuck. In effect the ball causes the externally serrated portions 22 of these fingers to firmly wedge against the work. By such action, the work W is positively gripped and bodily rotates with the chuck C as the latter rotates with the spindle removably sustained in appropriate rotatable means 23.

To remove the work W from the chuck C, the regulator is first rotated in a direction to disengage the abutment annular shoulder 19 from the ends of the driven pin D. Hence the pressure applied by pin D is removed from the tumbler P slidably guided in the axially arranged bore 24 of the nipple N. By this action ball B is relieved of pressure and therefore automatically retracts. It follows that wedging action imparted by ball B on the hinged fingers is removed. Consequently these fingers release their grip or clamping action from the workpiece W and the latter may be removed from the chuck.

When the chuck is in a contracted or closed relation the fingers F are retracted as illustrated in Fig. 3 so that their apices of the inner beveled faces which define the teeth T are close together. However when the regulator R is actuated the wedge B may be readily adjusted to the desired pressure required to hold the swingable fingers clamped against the workpiece to preclude the latter from involuntary slippage relative to the chuck. To facilitate rotation of the regulator, suitable wings or arm 26 are attached thereto.

In the matter of assembly, the regulator is first mounted on the threaded extension or socket 13. Thereafter the pin D is threaded into opening 16 and dropped into gap 17.

Subsequently the wedge B is dropped into the opening 25, the slidable plunger is inserted into the bore 24 of the nipple to partly project into the opening 25 defined by the swingable fingers and to partly project or overhang the nipple. Pursuant thereto, the nipple N is threaded into the socket 13. Now by rotating the regulator the wedge or ball B may be adjusted for the desired clamping relation.

Various changes may be made in the details of construction and arrangement of parts without departing from the spirit of the invention or sacrificing any of the advantages thereof inherent therein.

I claim:

1. A holder for removably sustaining a work piece comprising a chuck having an exteriorly threaded nipple, fingers having corresponding ends pivoted to and intermediate of said chuck and having internally disposed inclined surfaces diverging in a direction towards said nipple, a spindle having a socket including an internally threaded bore for adjustably receiving said nipple and including externally arranged threads and including diametrically arranged slots, a ball within said chuck for engagement with said inclined surfaces, plunger means concentrically and slidably disposed within said nipple and in part projecting into said chuck for engaging said ball, pin means disposed normal to said plunger means and slidably guided in said slots for actuating said plunger means, and an internally threaded rotatable and adjustable member coacting with said externally arranged threads and having means coacting with said pin means to drive the latter against said plunger means whereby the latter drives said ball against said surfaces for spreading and removably clamping said fingers against said workpiece.

2. A holder for removably sustaining a work piece comprising a hollow chuck having an exteriorly threaded and reduced nipple, serrated fingers having corresponding ends pivoted to and intermediate of said chuck and having internally disposed inclined and rectilinear surfaces diverging in a direction towards said nipple, a hollow spindle having at one end a socket including an internally threaded bore for adjustably receiving said nipple and including externally arranged threads and including diametrically arranged slots, a ball within said chuck for engagement with said surfaces, plunger means concentrically and slidably guided within said nipple and in part projecting into said chuck for engaging said ball, pin means disposed normal to said plunger means and slidably guided in said slots for actuating said plunger means and having terminals extending beyond said nipple, and an internally threaded rotatable and adjustable member coacting with said externally arranged threads and having an annular shoulder coacting with said terminals to drive the pin against said plunger means whereby the latter drives said ball against said surfaces for spreading and removably clamping said fingers against said workpiece.

LOUIS BENJAMIN.